(12) United States Patent
King (10) Patent No.: US 11,339,772 B2
(45) Date of Patent: May 24, 2022

(54) HYDRAULIC POWER UNITS WITH SUBMERGED MOTORS

(71) Applicant: KTI Hydraulics Inc., Santa Ana, CA (US)

(72) Inventor: Chun Nien King, Irvine, CA (US)

(73) Assignee: KTI Hydraulics Inc., Santa Ana, CA (US)

(*) Notice: Subject to any disclaimer, the term of this patent is extended or adjusted under 35 U.S.C. 154(b) by 265 days.

(21) Appl. No.: 16/714,592

(22) Filed: Dec. 13, 2019

(65) Prior Publication Data

US 2021/0180577 A1    Jun. 17, 2021

(51) Int. Cl.
| F04B 23/02 | (2006.01) |
| F15B 15/20 | (2006.01) |
| F15B 7/08 | (2006.01) |
| F04B 17/03 | (2006.01) |

(52) U.S. Cl.
CPC .......... *F04B 23/021* (2013.01); *F04B 17/03* (2013.01); *F15B 7/08* (2013.01); *F15B 15/20* (2013.01)

(58) Field of Classification Search
CPC .......... F04B 17/03; F04B 23/021; F15B 7/08; F15B 15/20
See application file for complete search history.

(56) References Cited

U.S. PATENT DOCUMENTS

| 1,970,484 | A | 8/1934 | Arutunoff et al. |
| 4,861,239 | A | 8/1989 | Simmons et al. |
| 5,078,236 | A | 1/1992 | Shimoaki et al. |
| 5,109,672 | A | 5/1992 | Chenoweth et al. |
| 5,348,125 | A | 9/1994 | Stribling |
| 6,290,474 | B1 * | 9/2001 | Bavendiek ............... B66F 9/22 417/423.3 |
| 10,760,599 | B2 * | 9/2020 | King ...................... F15B 15/18 |
| 2010/0170689 | A1 * | 7/2010 | Wagner ..................... F04B 9/12 173/177 |
| 2014/0169997 | A1 | 6/2014 | Ibatici |

FOREIGN PATENT DOCUMENTS

EP    1081083 A2    3/2001

* cited by examiner

*Primary Examiner* — Patrick Hamo
(74) *Attorney, Agent, or Firm* — Chong IP Law Group (57) ABSTRACT

A hydraulic power unit ("HPU") with a submerged motor for moving hydraulic fluid between a first chamber and a second chamber of a hydraulic device is provided. The HPU may comprise a tank for storing hydraulic fluid, wherein the tank houses: a motor submerged in the hydraulic fluid, the motor having a powered on and a powered off configuration based on at least one command signal; and a pump submerged in the hydraulic fluid and connected to the motor, wherein the motor drives the pump to route the hydraulic fluid in and out of the tank.

20 Claims, 11 Drawing Sheets

HYDRAULIC POWER UNITS WITH SUBMERGED MOTORS

FIELD OF THE INVENTION

The present invention generally relates to hydraulics and more specifically to hydraulic power units with submerged electric motors.

BACKGROUND

Hydraulics is a technology that includes the use of liquids (e.g., hydraulic fluid) in the application of mechanical properties. At its core, hydraulics may be used for the generation, control, and transmission of power by the use of pressurized hydraulic fluids. Typically, hydraulic fluid is the medium by which power is transferred in hydraulic devices and/or systems. Common hydraulic fluids may be based on mineral oil or water. In practice, hydraulic devices and/or systems may be central parts of various technologies, such as, but not limited to, hydraulic brakes, power steering systems, aircraft flight control systems, lifts, dump trucks, and various other machinery.

SUMMARY OF THE INVENTION

The various embodiments of the present hydraulic power units ("HPUs") with submerged motors (may also be referred to as "HPUs") contain several features, no single one of which is solely responsible for their desirable attributes. Without limiting the scope of the present embodiments, their more prominent features will now be discussed below. In particular, the present HPUs with submerged motors will be discussed in the context of a truck bed equipped with a hydraulic lift (may also be referred to as "dump truck") or a dump trailer. However, the use of a dump truck/dump trailer is merely exemplary, and the present HPUs with submerged motors may be utilized for a variety of hydraulic applications as appropriate to the requirements of a specific hydraulic device and/or system in accordance with various embodiments of the invention. After considering this discussion, and particularly after reading the section entitled "Detailed Description," one will understand how the features of the present embodiments provide the advantages described here.

One aspect of the present embodiments includes the realization that in current hydraulic power units other than the present embodiments, hydraulic fluid may only be used for operating the attached hydraulic device without taking advantage of the hydraulic fluids' various properties (e.g., thermal cooling, noise canceling, shielding, etc.). For example, in current hydraulic power units other than the present embodiments, a motor and/or a pump may be exposed to the elements resulting in degradation and/or damage from lacking a protective shield. Further, the motor and/or the pump may produce unwanted noise. In addition, since the motor, pump, and/or the tank (may also be referred to as "reservoir") are separate discrete components, the HPU may take up valuable space. The present embodiments solve these problems by providing an HPU with a tank containing hydraulic fluid and configured to house, within the tank, a motor and a pump submerged in the hydraulic fluid. The present embodiments thus advantageously enable the motor to be submerged in the hydraulic fluid, thereby protecting the motor from moisture and foreign contaminates. In addition, since the motor is submerged in the hydraulic fluid and enclosed in the tank, the noise produced by the HPU may be significantly reduced. Moreover, HPUs with submerged motors may operate at a more constant and lower temperature due to the heat transfer/cooling properties of the hydraulic fluid. Further, the size of the HPU may be significantly reduced (e.g., by 50% or more) as the motor and/or pump are contained within the tank. The present embodiments provide these advantages and enhancements, as described below.

In a first aspect, a hydraulic power unit ("HPU") for moving hydraulic fluid between a first chamber and a second chamber of a hydraulic device is provided, the HPU comprising: a tank for storing hydraulic fluid, wherein the tank houses: a motor submerged in the hydraulic fluid, the motor having a powered on and a powered off configuration based on at least one command signal; and a pump submerged in the hydraulic fluid and connected to the motor, wherein the motor drives the pump to route the hydraulic fluid in and out of the tank.

In an embodiment of the first aspect, the HPU further comprises a manifold connected to the pump, wherein the manifold comprises: an A port configured to connect to the first chamber of the hydraulic device; a B port configured to connect to the second chamber of the hydraulic device; a first solenoid valve connected to the tank, wherein the first solenoid valve is configured to shift between a plurality of positions based on at least one command signal; a second solenoid valve connected to the A port, wherein the second solenoid valve is configured to shift between a plurality of positions based on the at least one command signal; and a first check valve having a closed end connected to the B port.

In another embodiment of the first aspect, the manifold is connected to the pump via a first opening in a first surface of the tank.

In another embodiment of the first aspect, in an initial state: the motor is in the powered off configuration; the second solenoid valve is in a first position thereby loading a control check valve wherein a closed end of the control check valve is connected to the A port; and the first solenoid valve is in a first position, wherein the first position of the first solenoid valve connects an open end of the control check valve to the tank.

In another embodiment of the first aspect, the hydraulic fluid entering the A port from the first chamber is blocked from moving by the closed end of the control check valve and the hydraulic fluid entering the B port from the second chamber is blocked from moving by the closed end of the first check valve.

In another embodiment of the first aspect, the at least one command signal is an up command signal, wherein: the second solenoid valve is in a first position thereby loading a control check valve; the first solenoid valve is in a second position, wherein the second position of the first solenoid valve connects the pump to an open end of the control check valve; and the motor is in the powered on configuration providing power to the pump to route the hydraulic fluid from the tank to the A port.

In another embodiment of the first aspect, the hydraulic fluid exits the A port in to the first chamber of the hydraulic device, thereby placing the hydraulic device in an extending state.

In another embodiment of the first aspect, the hydraulic fluid is pushed out of the second chamber and is routed through: the closed end of the first check valve by overcoming the first check valve setting; and the first solenoid valve in the second position thereby allowing the hydraulic fluid to flow in to the tank.

In another embodiment of the first aspect, the at least one command signal is a down command signal, wherein: the second solenoid valve is in a second position, thereby loading a control single-directional connector; the first solenoid valve is in a first position, wherein the first position of the first solenoid valve connects the pump to the open end of the first check valve; and the motor is in the powered on configuration providing power to the pump to route the hydraulic fluid from the tank to the B port.

In another embodiment of the first aspect, the hydraulic fluid exits the B port in to the second chamber of the hydraulic device, thereby placing the hydraulic device in a retracting state.

In another embodiment of the first aspect, the hydraulic fluid is pushed out of the first chamber and is routed through: the control single-directional connector; and the first solenoid valve in the first position, thereby allowing the hydraulic fluid to flow in to the tank.

In another embodiment of the first aspect, the at least one command signal is received from an input device connected to the HPU.

In another embodiment of the first aspect, the input device is wirelessly connected to the HPU.

In another embodiment of the first aspect, the motor is a direct current motor.

In another embodiment of the first aspect, the motor is attached to an interior facing surface of the tank.

In another embodiment of the first aspect, the motor is connected to a power source via at least one opening in a first surface of the tank.

In another embodiment of the first aspect, the motor is connected to a start solenoid via the at least one opening in the first surface of the tank.

In another embodiment of the first aspect, the hydraulic fluid absorbs waste heat produced by the motor.

In another embodiment of the first aspect, the hydraulic fluid absorbs noise produced by the motor.

In another embodiment of the first aspect, the hydraulic device is a dual-acting hydraulic cylinder.

BRIEF DESCRIPTION OF THE DRAWINGS

The various embodiments of the present HPUs with submerged motors now will be discussed in detail with an emphasis on highlighting the advantageous features. These embodiments depict the novel and non-obvious HPUs with submerged motors shown in the accompanying drawings, which are for illustrative purposes only. These drawings include the following figures.

DETAILED DESCRIPTION OF THE DRAWINGS

The following detailed description describes the present embodiments with reference to the drawings. In the drawings, reference numbers label elements of the present embodiments. These reference numbers are reproduced below in connection with the discussion of the corresponding drawing features.

Turning now to the drawings, HPUs with submerged motors (may also be referred to as "HPUs") in accordance with embodiments of the invention are disclosed. In many embodiments, HPUs with submerged motors may be connected to one or more hydraulic devices, such as, but not limited to, a dual-acting hydraulic cylinder. In various embodiments, the HPUs with submerged motors may be part of a larger hydraulic system. In many embodiments, HPUs with submerged motors may include a tank for holding hydraulic fluid and configured to house a motor and/or a pump submerged in the hydraulic fluid. In many embodiments, the motor may power the pump for regulating fluid flow between various components in the hydraulic system, as further described below. In various embodiments, the HPU may also include a manifold having an A port and a B port to connect to the hydraulic device (e.g., hydraulic cylinder), as further described below. In some embodiments, the HPU may also include a power source, such as, but not limited to, a battery, that provides power to the motor. In some embodiments, the HPU may be connected to an input device that provides at least one command signal to the HPU, as further described below. Hydraulic systems utilizing hydraulic cylinders in accordance with embodiments of the invention are further discussed below.

Dump Trucks with Dual-Acting Hydraulic Cylinders

A variety of systems may use hydraulic cylinders to provide a directional force using pressurized hydraulic fluid (may also be referred to as "fluid"). Typically, a hydraulic cylinder may include a cylinder barrel in which a piston is connected to a piston rod that may move back and forth as the piston moves back and forth within the cylinder barrel. By connecting the piston rod to an external structure, the force generated by the pressurized hydraulic fluid may be applied to the external structure. In dual-acting hydraulic cylinders, the cylinder barrel may include a first chamber (may also be referred to as a "blind end") and a second chamber (may also be referred to as "rod end") separated by the piston, where the first chamber may have a first pressure level and the second chamber may have a second pressure level. As further described below, the first and second chambers may be connected by an HPU with a submerged motor configured to move the hydraulic fluid between the first and second chambers.

Figure 1:
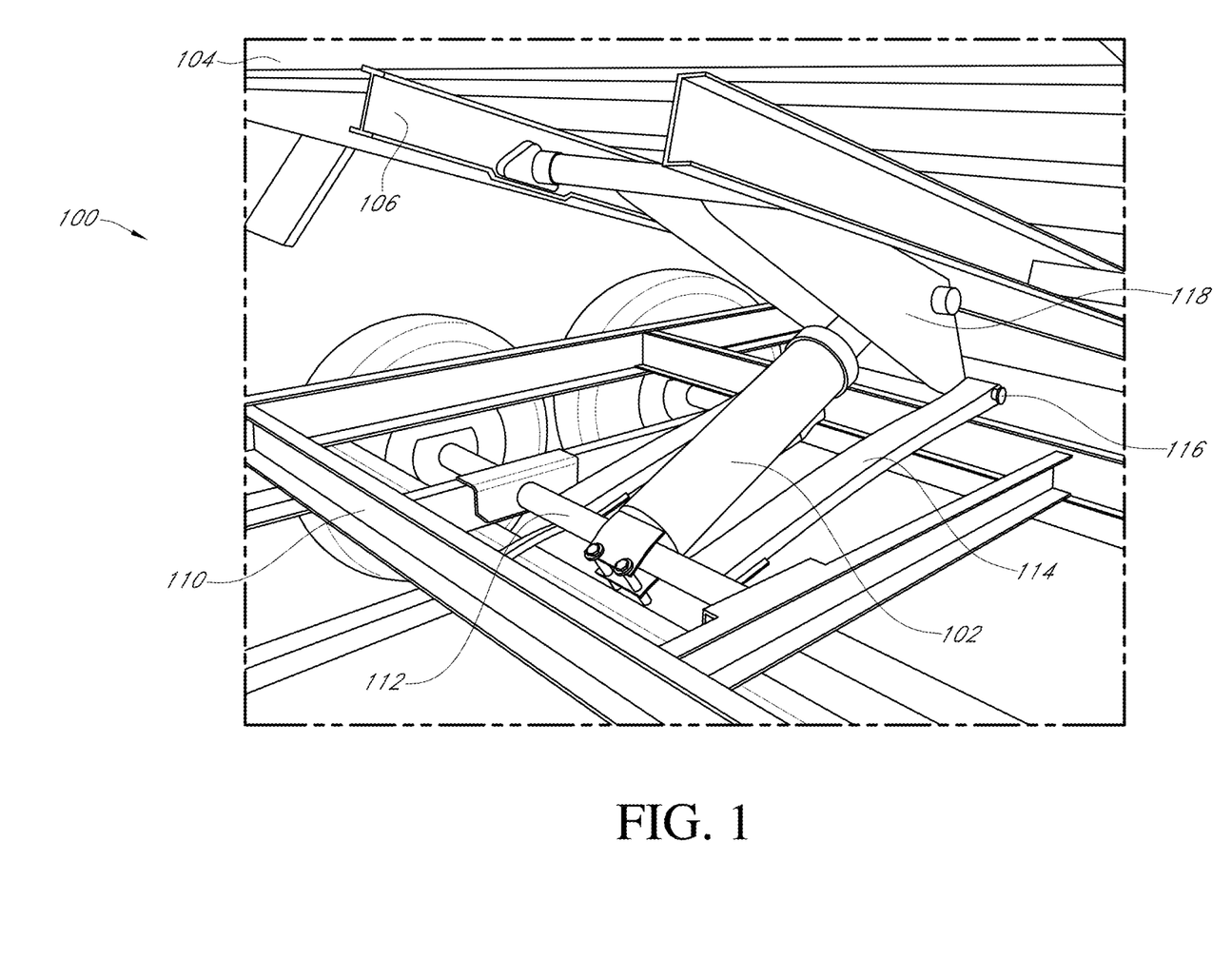
FIG. 1 illustrates a dump truck utilizing a dual-acting hydraulic cylinder (may also be referred to as "hydraulic cylinder" or "cylinder") for lifting a truck bed in accordance with an embodiment of the invention.

A dump truck utilizing a hydraulic cylinder for lifting a truck bed in accordance with an embodiment of the invention is illustrated in FIG. 1. The dump truck 100 may include a dual-acting hydraulic cylinder 102 for lifting a truck bed 104. The dump truck 100 may also include a frame 110 having a bar 112 that connects to one side of the hydraulic cylinder 102 (e.g., the blind end). One of ordinary skill in the art would recognize that a direct push and/or a scissor hoist are two common methods of raising the truck bed (shown in FIG. 1 is a scissor hoist). In addition, the truck bed 104 may be connected to a frame 106 that attaches to a lift arm having a first portion 114, a joint 116, and a second portion 118. In various embodiments, a piston rod may extend from a rod end of the hydraulic cylinder 102 and connect to the second portion 118 of the lift arm. In several embodiments, the lift arm may be configured to receive force from the hydraulic cylinder 102 via the piston rod to raise or lower the truck bed 104, as further described below.

As described above, a dual-acting hydraulic cylinder may have two chambers (e.g., a first chamber and a second chamber) that may be connected by an HPU with a submerged motor for moving hydraulic fluid between the two chambers for raising and/or lowering the truck bed 104. For example, the first chamber may have a first port (may also be referred to as "bottom port") that connects to a corresponding first port of a manifold of the HPU (may also be referred to as "A port") for allowing the hydraulic fluid to enter and exit the first chamber. Further, the second chamber may include a second port (may also be referred to as "top port") that connects to a corresponding second port of the manifold of the HPU (may also be referred to as "B port") for allowing the hydraulic fluid to enter and exit the second chamber.

Figure 2A:
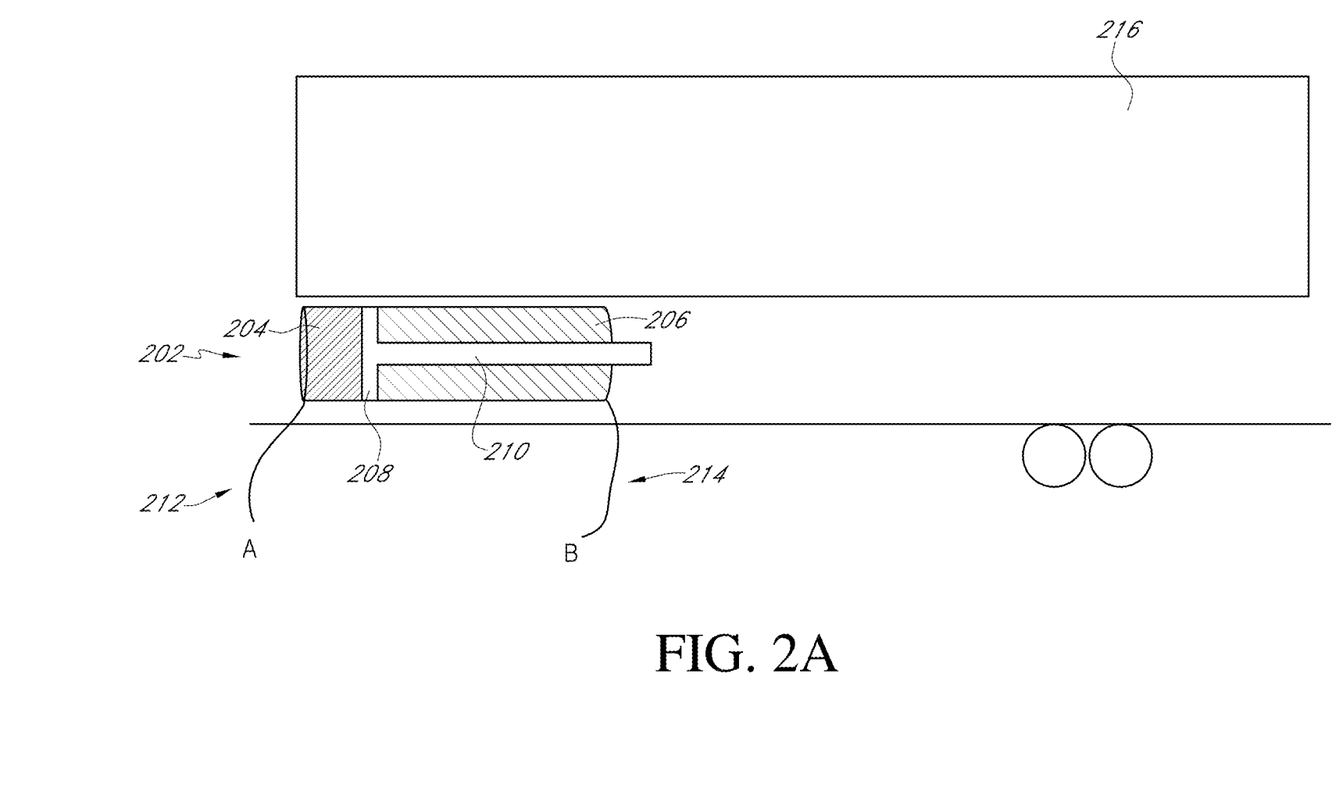
FIGS. 2A-C illustrate a hydraulic cylinder in various states relative to positions of a truck bed in accordance with an embodiment of the invention.
Figure 2B:
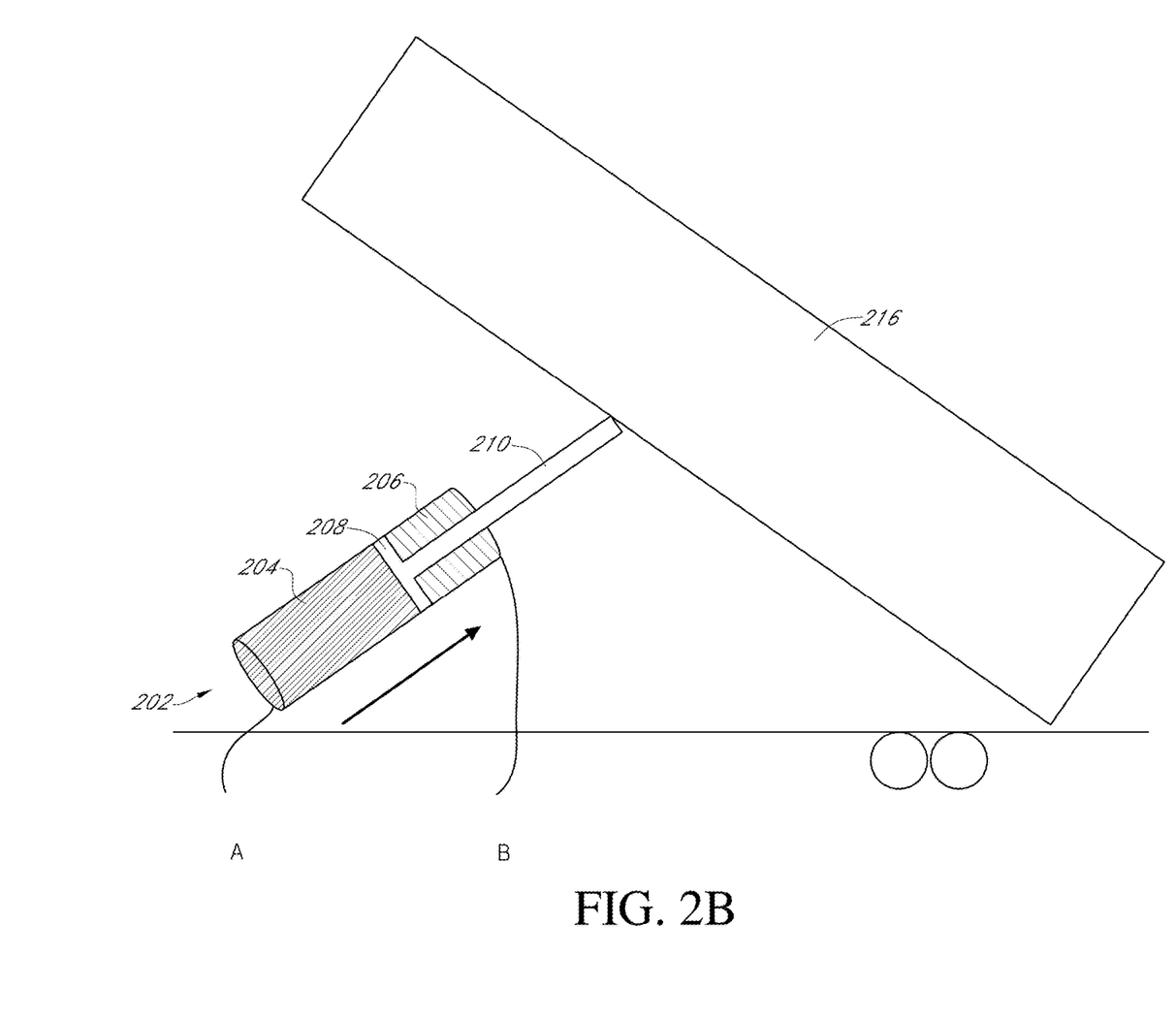
Figure 2C:
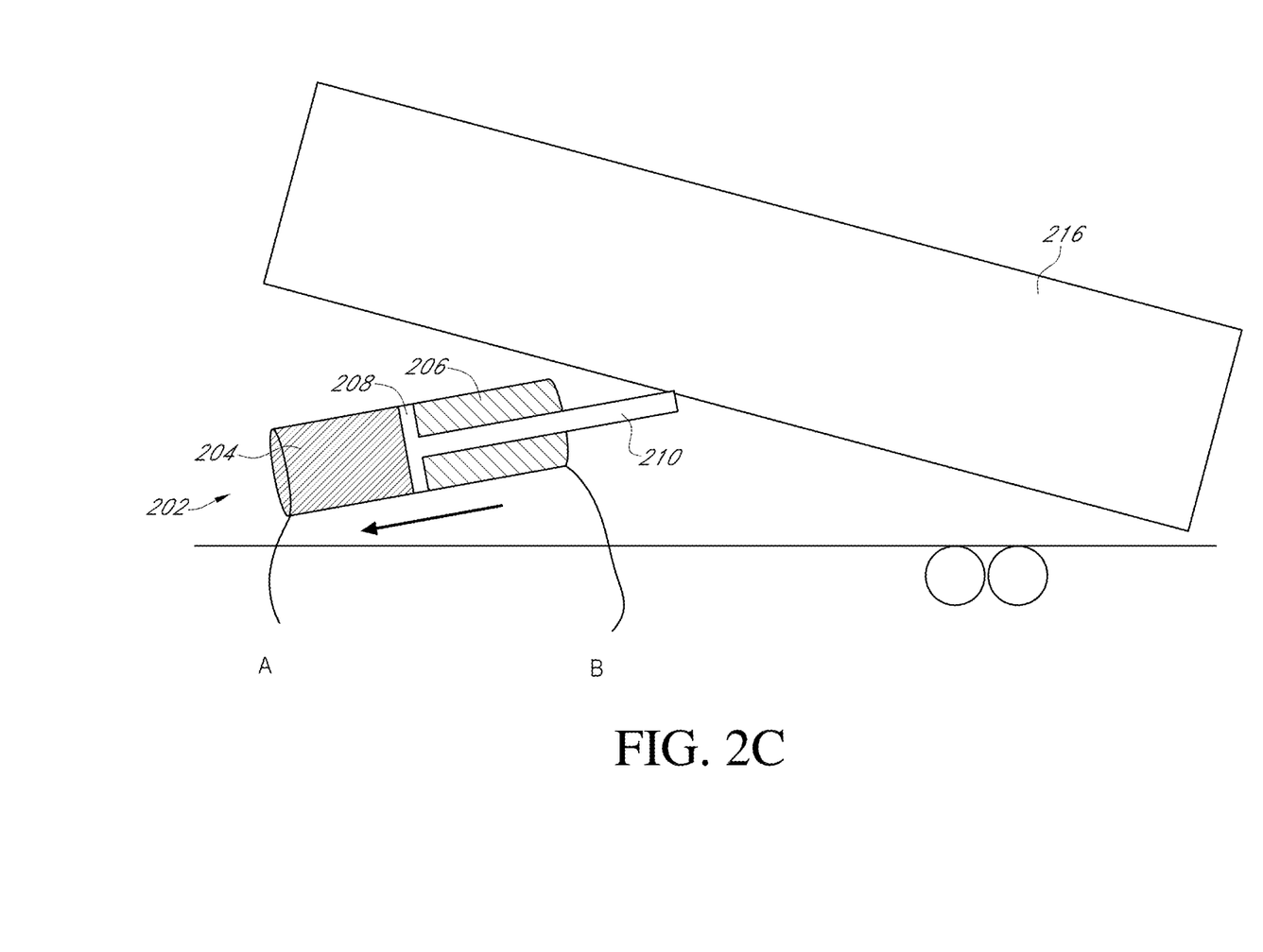

A dual-acting hydraulic cylinder in various states relative to positions of a truck bed in accordance with an embodiment of the invention is illustrated in FIGS. 2A-C. In reference to FIG. 2A, the truck bed 216 is level and the hydraulic cylinder 202 is in its initial state. In many embodiments, the hydraulic cylinder 202 may include a first chamber 204 and a second chamber 206 separated by a piston 208. The piston 208 may be connected to a piston rod 210 that extends out from the second chamber 206 to attach to a structural device such as, but not limited to, a lift arm that may be connected to the truck bed 216 or directly to the truck bed 216. In addition, the first chamber 204 may have a first port connected to a first hydraulic tube 212 (may also be referred to as "first hose") that connects to an A port of an HPU with a submerged motor, as further described below. Likewise, the second chamber 206 may have a second port connected to a second hydraulic tube 214 (may also be referred to as "second hose") that connects to a B port of the HPU with a submerged motor, as further described below. In the initial state, the piston may be positioned such that the amount of hydraulic fluid in the first chamber 204 is less than when the hydraulic cylinder is in operation. For illustrative purposes, the amount of hydraulic fluid in the first chamber 204 is shown relatively smaller than the amount of hydraulic fluid in the second chamber 206.

In reference to FIG. 2B, the hydraulic cylinder 202 may be used to lift (may also be referred to as "raise") the truck bed 216. In such embodiments, the hydraulic fluid may be transferred from the second chamber 206 to the first chamber 204 via the HPU (not illustrated) resulting in the movement of the piston 208 resulting in the piston rod 210 actuating (e.g., extending) and thus lifting the truck bed 216. During the process of extending, the piston 208 may move such that the piston rod 210 extends out and away from the rod end of the hydraulic cylinder 202. In many embodiments, the raising process may be initiated by an operator providing an input to the HPU via an input device. For example, the operator may press an "up" button, as further described below. The operator may stop the raising process by providing an input to the HPU, such as but not limited to, releasing the up button. In such embodiments, the HPU may stop the movement of the hydraulic fluid from the second chamber 206 to the first chamber 204, and thus the truck bed 216 may be stopped at a particular position.

In reference to FIG. 2C, the hydraulic cylinder 202 may be configured to lower the truck bed 216. In such embodiments, the hydraulic fluid may be transferred from the first chamber 204 to the second chamber 206 via the HPU (not illustrated) resulting in the movement of the piston 208 causing the piston rod 210 to retract, thereby lowering the truck bed 216. During the process of lowering, the piston 208 may move such that the piston rod 210 retracts towards the blind end of the hydraulic cylinder 202. In many embodiments, the lowering process may be initiated by an operator providing an input to the HPU via an input device. For example, the operator may press a "down" button, as further described below. The operator may stop the lowering process by providing an input to the HPU, such as but not limited to, releasing the down button. In such embodiments, the HPU may stop the movement of the hydraulic fluid from the first chamber 204 to the second chamber 206, and thus the truck bed 216 may be stopped at a particular position.

Although specific hydraulic systems for dump trucks using dual-acting hydraulic cylinders are discussed above with respect to FIGS. 1-2C, any of a variety of systems using various hydraulic devices as appropriate to the requirements of a specific application can be utilized in accordance with embodiments of the invention. HPUs with submerged motors in accordance with embodiments of the invention are discussed further below.

HPUs with Submerged Motors

HPUs with submerged motors may include a tank for holding hydraulic fluid and be configured to house a motor submerged in the hydraulic fluid. In various embodiments, the submerged motor may be connected to a pump that is also submerged in the hydraulic fluid. In many embodiments, the motor may also be connected to a power supply that provides power to the motor based on at least one command signal, as further described below. The submerged motor may drive the pump for regulating the flow of hydraulic fluid between various components in a hydraulic system. For example, the pump may be connected to a manifold having an A port and a B port to connect to a hydraulic device (e.g., hydraulic cylinder). In many embodiments, the manifold may include a first solenoid valve and a second solenoid valve, each configured based on at least one command signal, as further described below.

Figure 3A:
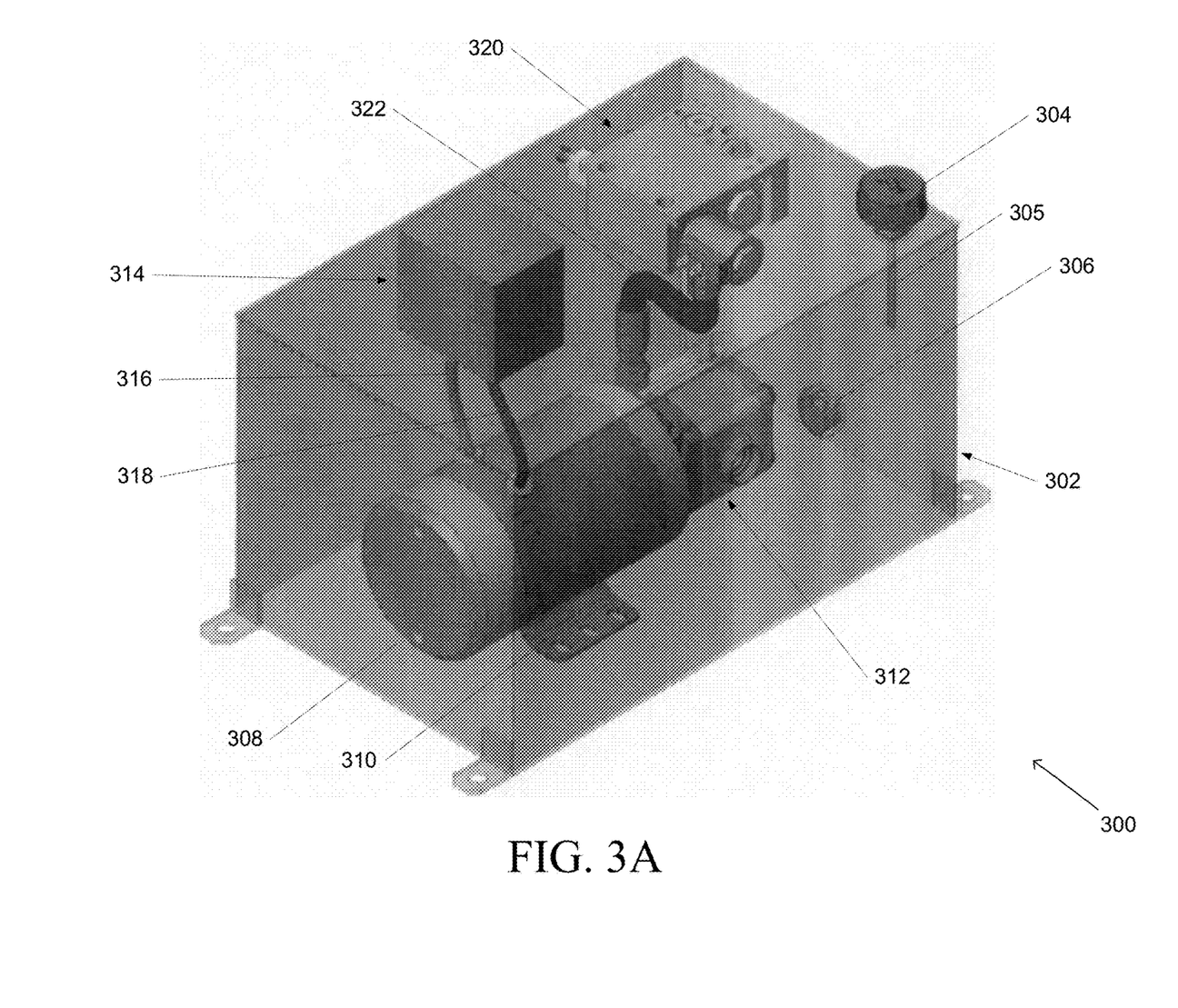
FIG. 3A is a schematic diagram illustrating an HPU with a submerged motor in accordance with an embodiment of the invention.

A schematic diagram illustrating a perspective view of an HPU with a submerged motor in accordance with an embodiment of the invention is illustrated in FIG. 3A. The HPU 300 may include a tank 302 configured to house a motor 308 for driving a pump 312, as further described below. In many embodiments, the motor 308 may be secured to an interior facing surface of the tank 302. In several embodiments, the motor 308 may be secured to the tank 302 using a variety of securing device(s) 310 known to one of ordinary skill in the art. In various embodiments, the tank 302 may be made of a variety of materials such as, but not limited to, steel, cast aluminum, and/or any other suitable material known to one of ordinary skill in the art. In some embodiments, the tank 302 may be produced by welding the various sides and components. In some embodiments, the tank 302 may be produced using a die casting process. In some embodiments, the tank 302 may be produced using any combination of processes such as, but not limited to, welding and die casting. Further, the tank 302 may be built to be a variety of sizes depending on various factors, such as, but not limited to, the size of the motor 308, the size of the pump 312, the particular hydraulic device for connecting to the HPU, the space available for a particular application, etc. For example, the tank 302 may be built to hold 5 quarts, 10 quarts, 15 quarts, etc. of hydraulic fluid.

In reference to FIG. 3A, the tank 302 may include a first opening that may be covered with a cap 304 for filling the tank 302 with the hydraulic fluid. In many embodiments, the cap 304 may also include a measuring stick 305 for measuring the amount of hydraulic fluid in the tank 302. The tank 302 may also include a second opening that may be covered with a cap 306 for draining the hydraulic fluid from the tank 302. In many embodiments, the cap 304 and the cap 306 may be fitted and/or mated with their respective openings in the tank 302 in a manner known to one of ordinary skill in the art. For example, the caps 304, 306 may open and close their respective openings using a thread fit or any other closure device and/or system known to one of ordinary skill. In some embodiments, the first opening may be located on a top surface of the tank 302 to take advantage of gravity acting on the hydraulic fluid in filling the tank 302 with the hydraulic fluid. In some embodiments, the second opening may be located on a side surface of the tank 302 and located closer to a bottom surface to take advantage of gravity acting on the hydraulic fluid in draining the hydraulic fluid from the tank 302. The tank 302 may be filled with a variety of levels of hydraulic fluid so long as the motor 308 and/or pump 312 are submerged. For example, in some embodiments, the tank may be 80% filled with the hydraulic fluid. In some embodiments, the amount of hydraulic fluid may depend on the hydraulic fluid capacity of the hydraulic device connected to the HPU. For example, the tank 302 may be filled to a different capacity when operating a 2-inch cylinder or a 5-inch cylinder.

In further reference to FIG. 3A, the HPU 300 may also include a manifold 320 connected to the pump 312 via a connector 322, as further described below. In many embodiments, the connector 322 may be hollow, thereby allowing hydraulic fluid to move between the tank 302 (via the pump 312) and the manifold 320, as further described below. The manifold 320 may include an A port to connect to a first chamber of the hydraulic cylinder and a B port to connect to a second chamber of the hydraulic cylinder, as further described below. In many embodiments, the HPU 300 may also include an electrical box 314 connected to the motor 308 via connectors 316, 318 in placing the motor 308 into various configurations (e.g., a powered on or a powered off configuration), as further described below. For example, in some embodiments, the electrical box 314 may house a start solenoid and/or a battery. In some embodiments, the start solenoid and/or the battery may be housed separately and housed outside of the electrical box 314. In some embodiments, the connectors 316, 318 may comprise material that repels the hydraulic fluid for increased longevity. For example, the connectors 316, 318 may be made using a Nitrile rubber (i.e., Buna-N) material, etc.

Figure 3B:
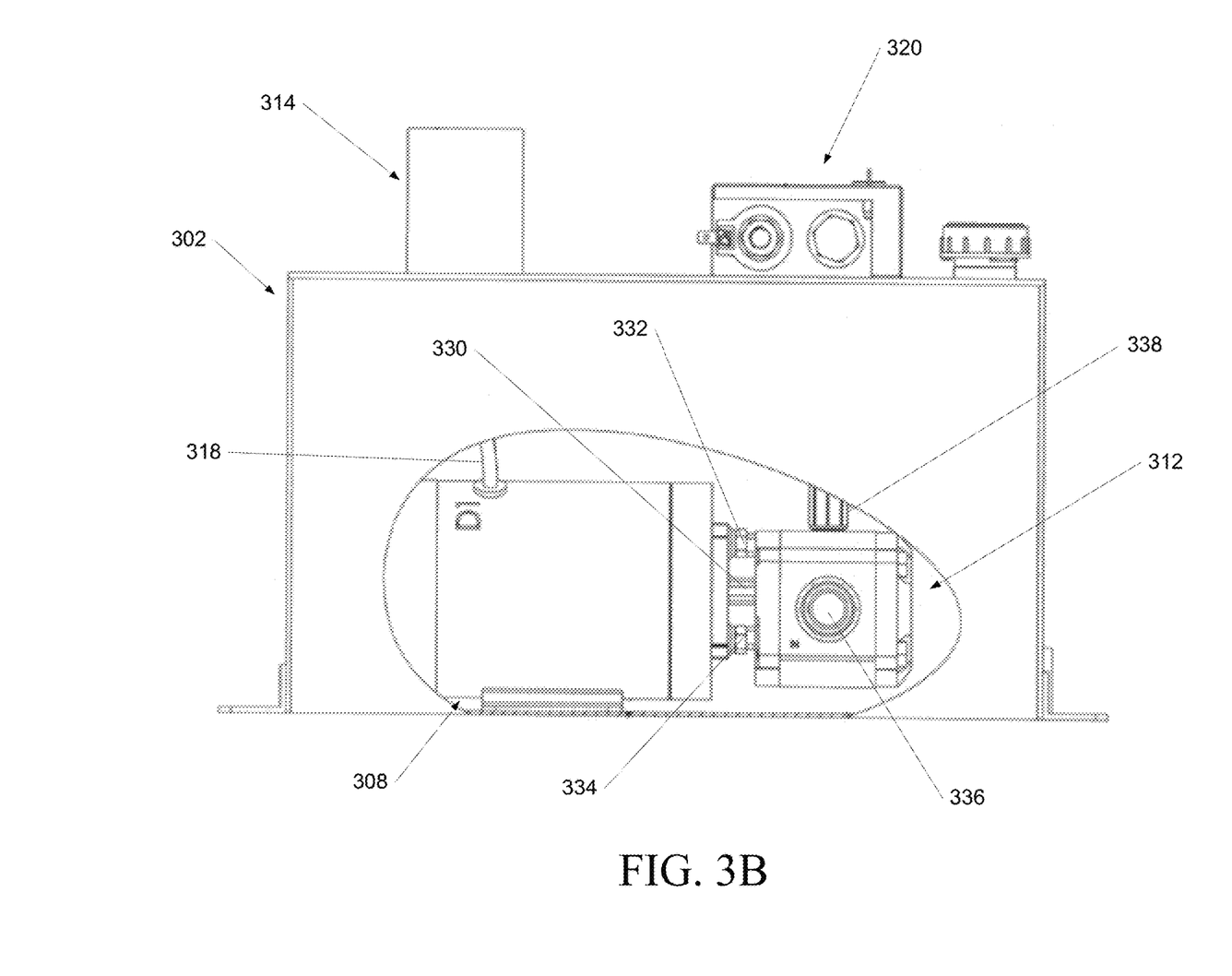
FIG. 3B is a schematic diagram illustrating a side view into a tank of an HPU with a submerged motor in accordance with an embodiment of the invention.

A schematic diagram illustrating a side view into the interior of the tank of the HPU in accordance with an embodiment of the invention is illustrated in FIG. 3B. As described above, the tank 302 may be configured to house a submerged motor 308 connected to a submerged pump 312. For example, the pump 312 may be connected to the motor 308 via nuts 332, 334. In some embodiments, the pump 312 may also be connected to the motor 308 via a coupler 330 that couples the motor 308 to a shaft of the pump 312. For example, the coupler 330 may be a hex coupler, etc. In addition, the pump 312 may be connected to the manifold 320 via a connector 322. In some embodiments, the connector 322 may include a fitting screw 338 to connect the connector 322 to the pump 312. In some embodiments, the fitting screw 338 may comprise copper and/or aluminum or any other material appropriate for use in a hydraulic fluid environment. In some embodiments, the pump 312 may include an opening 336 for accessing the hydraulic fluid in the tank 302.

In reference to FIG. 3B, the pump 312 may be a hydraulic gear pump and the motor 308 may be an electric direct current ("DC") powered motor 308. In operation, the motor 308 may turn the pump 312, and the pump 312 may take hydraulic fluid from the tank 302 via the opening 336 and push the hydraulic fluid out of the tank 302 for moving hydraulic fluid between the first chamber and the second chamber of an attached hydraulic cylinder via the manifold 320, as further described below.

Figure 3C:
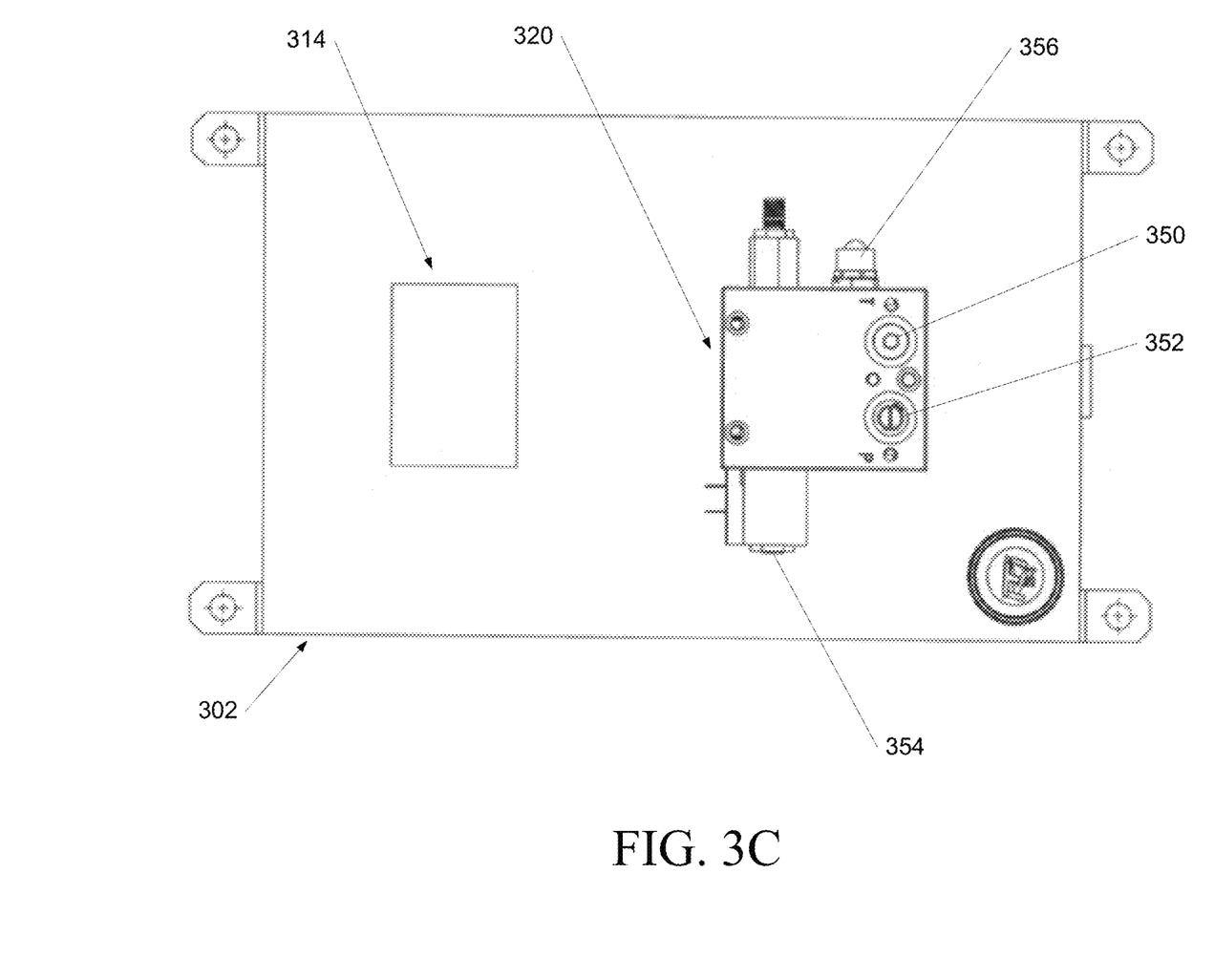
FIG. 3C is a schematic diagram illustrating a top view of an HPU with a submerged motor in accordance with an embodiment of the invention.

A schematic diagram illustrating a top view of the HPU in accordance with an embodiment of the invention is illustrated in FIG. 3C. The HPU may comprise a manifold 320 that may include an A port 350 that connects to a corresponding bottom port of a hydraulic cylinder via a first hose, as described above. Likewise, the manifold 320 may include a B port 352 that connects to a corresponding top port of a hydraulic cylinder via a second hose, as described above. In many embodiments, the HPU may receive at least one command signal from an input device connected to the electrical box 314 and/or the manifold 320. For example, the input device may include an up button and/or a down button. In many embodiments, the up button may provide an up command signal that configures the HPU to raise the truck bed and the down button may provide a down command signal that configures the HPU to lower the truck bed. In some embodiments, the input device may be directly connected (e.g., via wires) to the HPU and/or may be connected wireless using a variety of wireless communication protocols known to one of skill in the art, such as but not limited to, Bluetooth or WiFi.

In further reference to FIG. 3C, the manifold 320 may include a first relief valve 356 that may be normally closed but configured to open if the pressure across the first relief valve 356 reaches a valve setting. For example, the first relief valve 356 may be an adjustable cartridge relief valve that may have an adjustable valve setting from 1 pound per square inch ("PSI") to 5000 PSI. The manifold 320 may also include a first solenoid valve 354 that may shift between two or more positions based on an operator's desired functionality of the hydraulic cylinder (e.g. raise or lower). For example, the first solenoid valve 354 may be a cartridge 4-way, 2-position solenoid valve (or in some cases, a cartridge 4-way, 3-position solenoid valve) that may take a first position when raising the truck bed and take a second position when lowering the truck bed, as further described below. In some embodiments, the first solenoid valve 354 may be a separate component connected to the manifold 320 or may be an integral part of the manifold 320.

In further reference to FIG. 3C, the manifold 320 may also include additional hydraulic components, such as but not limited to a second relief valve (not illustrated) that may be a cartridge relief valve adjustable from 1 PSI to 5000 PSI. In addition, manifold 320 may further include a first check valve (not illustrated). Further, the manifold 320 may also include a second solenoid valve (not illustrated) (may also be referred to as "cartridge A & B port load holding solenoid valve"), as further described below. In various embodiments, the second solenoid valve may include a first position that allows the truck bed to maintain a static position (e.g., initial state), to be lowered, and/or to be raised, as further described below.

Figure 3D:
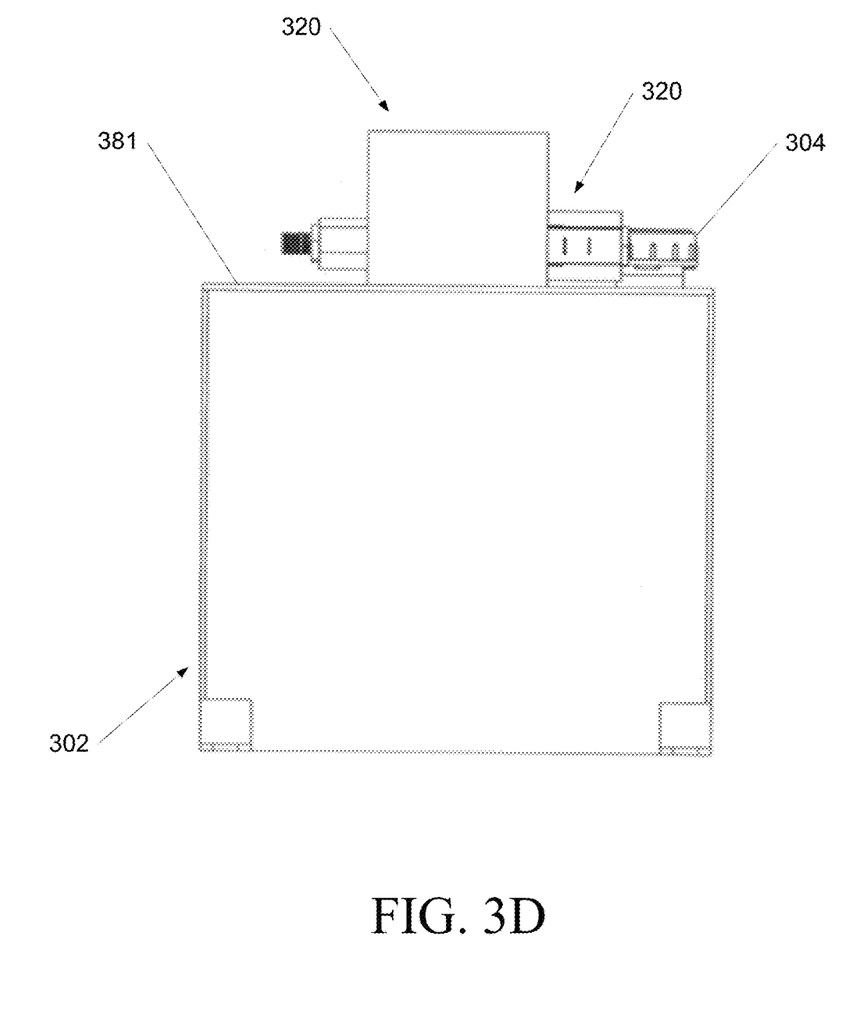
FIG. 3D is a schematic diagram illustrating a back view of an HPU with a submerged motor in accordance with an embodiment of the invention.

A schematic diagram illustrating a back view of the HPU in accordance with an embodiment of the invention is illustrated in FIG. 3D. The tank 302 may be configured to have a top surface 381 having a plurality of openings to access the inside of the tank 302. For example, the top surface 381 may have a first opening for filling the tank 302 with the hydraulic fluid. In many embodiments, the first opening may be covered with the cap 304, as described above. Further, the top surface 381 may also have one or more openings to connect the manifold 320 with the pump 312 located inside of the tank 302, as described above. Moreover, the top surface 381 may also have one or more openings to connect the electrical box 314 with the motor 308 located inside of the tank 302, as described above.

Although specific HPUs with submerged motors are discussed above with respect to FIGS. 3A-D, any of a variety of HPUs with submerged motors including HPUs with a variety of hydraulic components as appropriate to the requirements of a specific application can be utilized in accordance with embodiments of the invention. Further, although specific hydraulic components are illustrated as part of or connected to other components, the various hydraulic components may be either a part of or connected to other components as appropriate to the requirements of a specific application in accordance with embodiments of the invention. In addition, although specific hydraulic components are illustrated as being located in a particular position, the various hydraulic components may be placed in various positions as appropriate to the requirements of the specific application in accordance with embodiments of the invention. HPUs with submerged motors at initial states in accordance with embodiments of the invention are discussed further below.

HPUs with Submerged Motors at Initial States

As described above, an HPU may include a motor, pump, tank, and various hydraulic components for moving hydraulic fluid between first and second chambers of a dual-acting hydraulic cylinder. In the initial state, the HPU typically is not providing power to the hydraulic cylinder, and the truck bed is static in the fully lowered position.

Figure 4:
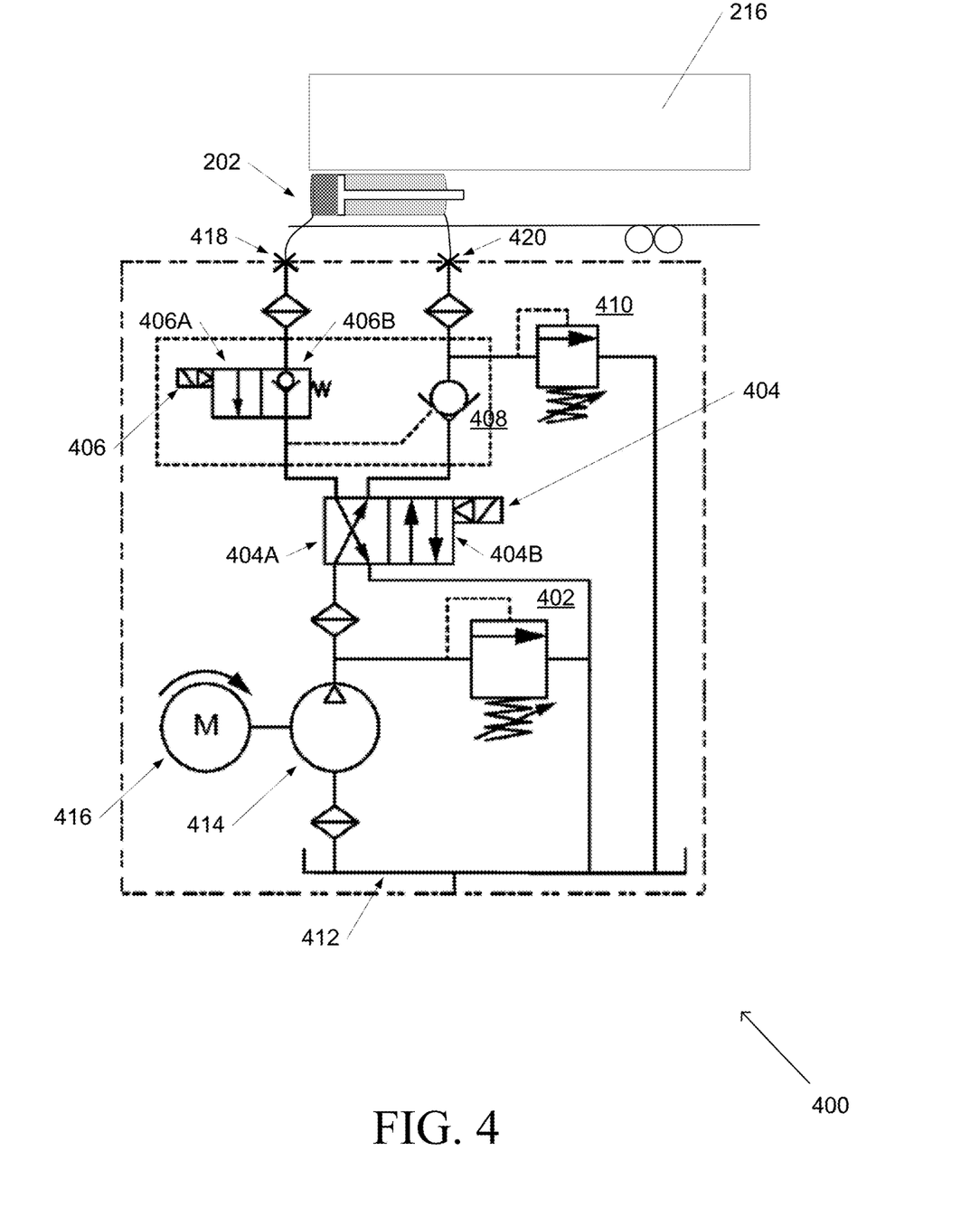
FIG. 4 is a schematic diagram illustrating an HPU with a submerged motor when a hydraulic cylinder is at rest (may also be referred to as a "neutral state" or "initial state") in accordance with an embodiment of the invention.

A schematic diagram illustrating an HPU with a submerged motor at an initial state in accordance with an embodiment of the invention is illustrated in FIG. 4. The schematic diagram 400 of the HPU with a submerged motor is shown connected to a hydraulic cylinder 202 with a truck bed 216 in a fully lowered position. As described above, the tank 412 holds the hydraulic fluid and is configured to house the motor 416 and/or the pump 414 submerged in the hydraulic fluid. As described herein, the motor 416 may be connected to a power source (not illustrated), and when the motor 416 is in the powered on configuration, the motor 416 may drive the pump 414 to push the hydraulic fluid from the tank 412 out of an A port 418 and/or a B port 420, thereby moving hydraulic fluid between a first chamber and a second chamber of the hydraulic cylinder 202.

In reference to FIG. 4, in the initial state, the motor 416 is in the powered off configuration, and the pump 414 is not activated. In various embodiments, the pump 414 may be connected to a first relief valve 402. The pump 414 may also be connected to a first solenoid valve 404 having a first position 404A and a second position 404B, as further described below. In the initial state, the first solenoid valve 404 may be in the first position 404A connecting the pump 414 to an open end (i.e., free flow direction end) of a first check valve 408. In many embodiments, the closed end (i.e., blocked flow direction) of the first check valve 408 may be connected to the B port 420 where the B port 420 may be connected to the second chamber of the hydraulic cylinder 202 via a second hose. In some embodiments, the closed end of the first check valve 408 may also be connected to a third cartridge relief valve 410 that connects to the tank 412.

In further reference to FIG. 4, the first chamber of the hydraulic cylinder 202 may be connected to the A port 418 via a first hose. In many embodiments, the A port 418 may be connected to a second solenoid valve 406, wherein the second solenoid valve 406 may have a first position and a second position. In various embodiments, the first position may include loading a control check valve 406A for the second solenoid valve 406, and the second position that may include loading a control single-directional connector 406B for the second solenoid valve 406. In the initial state, the second solenoid valve 406 may be in the first position and thus connect the A port 418 to a closed end of the control check valve 406A. In this configuration, the hydraulic cylinder 202 is held static since the hydraulic fluid in the first chamber is blocked from moving by the closed end of the control check valve 406A and the hydraulic fluid in the second chamber is blocked from moving by the closed end of the first check valve 408 and the second relief valve 410.

Although specific HPUs with submerged motors in an initial state for dump trucks are discussed above with respect to FIG. 4, any of a variety of HPUs with submerged motors for various hydraulic systems as appropriate to the requirements of a specific application can be utilized in accordance with embodiments of the invention. Further, although various components (e.g., tank, pump, valves) are discussed above with respect to FIG. 4, any of a variety of components as appropriate to the requirements of a specific application can be utilized in accordance with embodiments of the invention. For example, various components discussed above with respect to FIG. 4 could be interchanged as appropriate to the requirements of a specific application in accordance with embodiments of the invention. Further, although specific valve setting values are discussed above with respect to FIG. 4, various valve setting values as appropriate to the requirements of a specific application can be utilized in accordance with embodiments of the invention. Raising and lowering truck beds using HPUs with submerged motors in accordance with embodiments of the invention are discussed further below.

Raising and Lowering Truck Beds with HPUs with Submerged Motors

An HPU with a submerged motor may be configured to activate a hydraulic cylinder to raise or lower a truck bed. For example, the submerged motor may drive a submerged pump to transition hydraulic fluid between a first chamber and a second chamber of a hydraulic cylinder, thereby raising or lowering the truck bed. In many embodiments, the hydraulic cylinder may raise or lower the truck bed based on at least one command signal received from an input device. For example, an operator may use the input device to provide an up command signal, thereby raising the truck bed. Further, the operator may use the input device to provide a down command signal, thereby lowering the truck bed. As described further below, the at least one command signal may place the motor in a powered off configuration or a powered on configuration. Further, the at least one command signal may place the first solenoid in a first position or a second position. Likewise, the at least one command signal may place the second solenoid in a first position or a second position.

Figure 5:
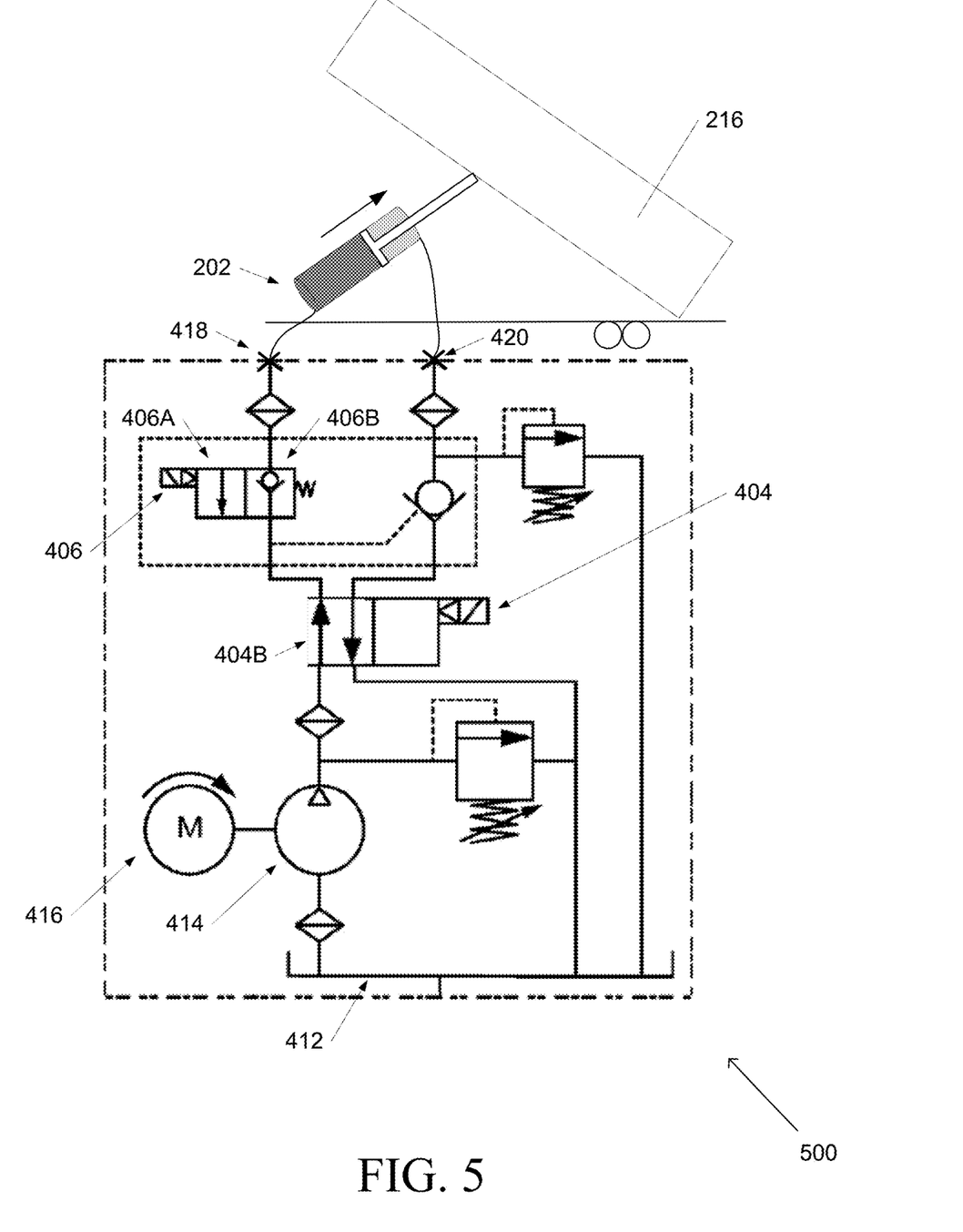
FIG. 5 is a schematic diagram illustrating an HPU with a submerged motor when a hydraulic cylinder is raising a truck bed in accordance with an embodiment of the invention.

A schematic diagram illustrating an HPU with a submerged motor for raising a truck bed in accordance with an embodiment of the invention is illustrated in FIG. 5. In many embodiments, the raising of the truck bed may be initiated by the HPU receiving an up command signal, as described above. In various embodiments, the up command signal may place the first solenoid valve 404 in a second position 404B. Further the up command signal may place the second solenoid valve 406 in a first position thereby loading the control check valve 406A.

In reference to FIG. 5, the schematic diagram 500 of the HPU is shown connected to a hydraulic cylinder 202 raising a truck bed 216. In many embodiments, the submerged motor 416 may be powered on and drive the pump 414 by turning the pump 414 and routing fluid from the tank 412 to the first solenoid valve 404 in a second position 404B. For example, in response to a command signal (e.g., up command signal), the first solenoid valve 404 may energize and transition from a first position 404A to the second position 404B. In the second position 404B, the HPU may allow the hydraulic fluid from the pump 414 to be directed to the open end of the control check valve 406A of the second solenoid 406 in its first position. The hydraulic fluid may then exit the A port 418 through a first hose connecting the A port 418 to the hydraulic cylinder 202. Thus, the hydraulic fluid may enter through the blind end of the cylinder and apply force on to the piston to extend the piston rod, thereby raising the truck bed 216.

In further reference to FIG. 5, hydraulic fluid in the second chamber of the hydraulic cylinder 202 may be moved to the tank 412. In many embodiments, the hydraulic fluid from the second chamber may get pushed out of the hydraulic cylinder 202 through a second hose connected to the B port 420. In such embodiments, the hydraulic fluid may be routed through the closed end of the first check valve 408 by overcoming the valve setting of the first check valve 408, as described above. The hydraulic fluid may then flow through the first solenoid valve 404 in the second position 404B, allowing the hydraulic fluid to return back to the tank 412.

Figure 6:
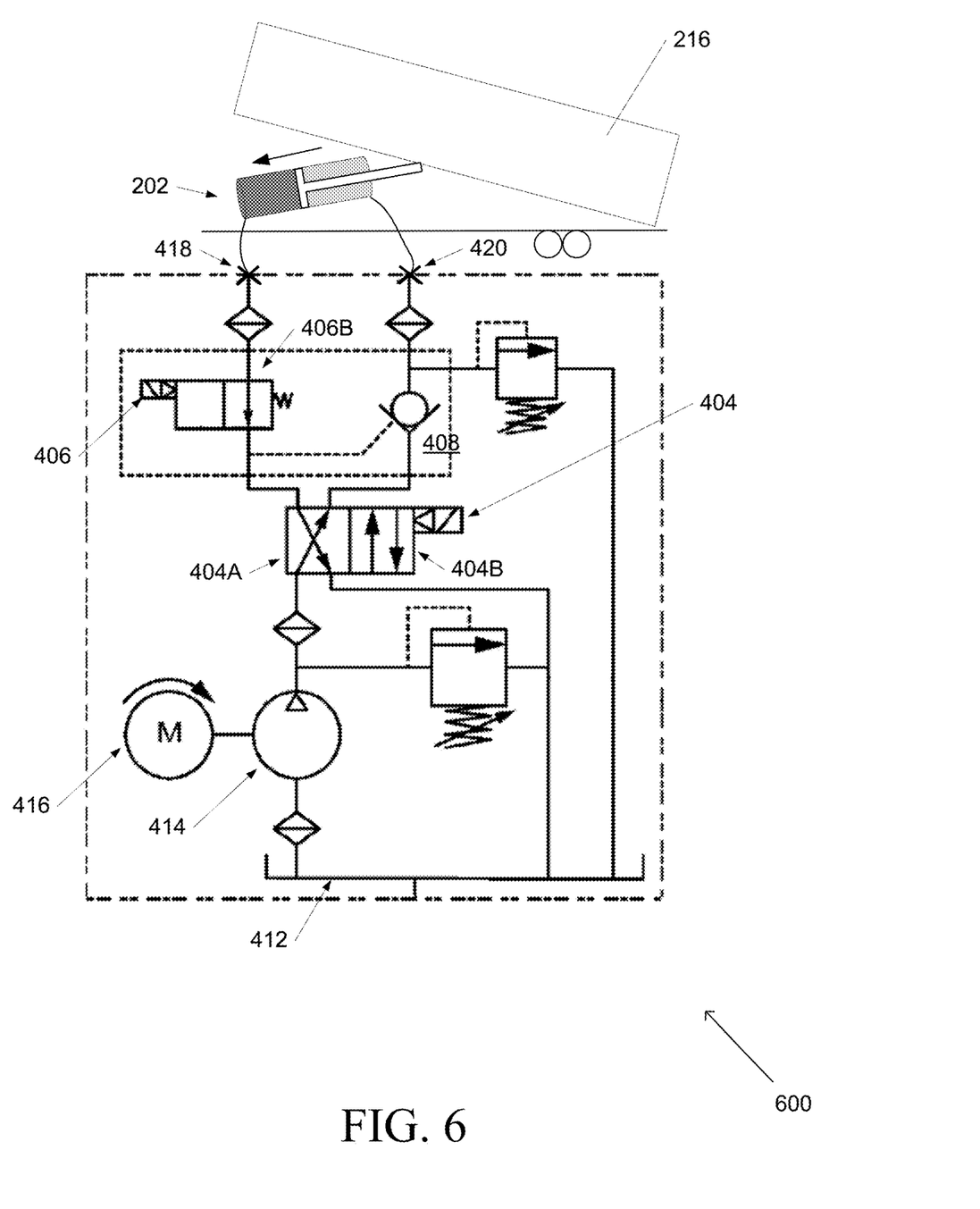
FIG. 6 is a schematic diagram illustrating an HPU with a submerged motor when a hydraulic cylinder is lowering a truck bed in accordance with an embodiment of the invention.

A schematic diagram illustrating an HPU with a submerged motor when the hydraulic cylinder is lowering a truck bed in accordance with an embodiment of the invention is illustrated in FIG. 6. In many embodiments, the lowering of the truck bed may be initiated by the HPU receiving a down command signal, as described above. In various embodiments, the down command signal may place the first solenoid valve 404 in a first position 404A. Further the down command signal may place the second solenoid valve 406 in a second position, thereby loading the control single-directional connector 406B.

In reference to FIG. 6, the schematic diagram 600 of the power unit is shown connected to a hydraulic cylinder 202 lowering the truck bed 216. In many embodiments, the down command signal may place the motor 416 in the powered on configuration, thereby driving the pump 414 and routing fluid from the tank 412 to the first solenoid valve 404 in the first position 404A. For example, in various embodiments, the down command signal may energize the first solenoid valve 404, transitioning the first solenoid valve 404 from the second position 404B to the first position 404A and allowing the hydraulic fluid to flow from the pump 414 and be directed to the open end of the first check valve 408. The hydraulic fluid may then exit the B port 420 through a second hose connecting the B port 420 to the second chamber of the hydraulic cylinder 420. Thus, the hydraulic fluid may enter through the rod end of the cylinder and apply force onto the piston to retract the piston rod lowering the truck bed 216.

In further reference to FIG. 6, the hydraulic fluid in the first chamber may be pushed out and returned back to the tank 412. For example, the hydraulic fluid from the first chamber may get pushed out of the first chamber though a first hose connecting to the A port 418. In such embodiments, the second solenoid valve 406 may be in a second position (i.e., loading the control single-directional connector 406B) that allows hydraulic fluid to flow through the control single-directional connector 406B routing the hydraulic fluid to the first solenoid 404 in its first position 404A. In various embodiments, the first position 404A of the first solenoid 404 routes the hydraulic fluid back in to the tank 412.

Although specific HPUs with submerged motors for raising and lowering truck beds are discussed above with respect to FIGS. 5-6, any of a variety of HPUs with submerged motors for various hydraulic systems as appropriate to the requirements of a specific application can be utilized in accordance with embodiments of the invention. Further, although various components (e.g., tanks, pumps, valves) are discussed above with respect to FIGS. 5-6, any of a variety of components as appropriate to the requirements of a specific application can be utilized in accordance with embodiments of the invention. For example, various components discussed above with respect to FIGS. 5-6 could be interchanged as appropriate to the requirements of a specific application in accordance with embodiments of the invention. Further, although specific valve setting values are discussed above with respect to FIGS. 5-6, various valve setting values as appropriate to the requirements of a specific application can be utilized in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A hydraulic power unit ("HPU") for moving hydraulic fluid between a first chamber and a second chamber of a hydraulic device, the HPU comprising:
   a tank for storing hydraulic fluid, wherein the tank houses:
      a motor submerged in the hydraulic fluid, the motor having a powered on and a powered off configuration based on at least one command signal; and
      a pump submerged in the hydraulic fluid and connected to the motor, wherein the motor drives the pump to route the hydraulic fluid in and out of the tank.

2. The HPU of claim 1 further comprising a manifold connected to the pump, wherein the manifold comprises:
   an A port configured to connect to the first chamber of the hydraulic device;
   a B port configured to connect to the second chamber of the hydraulic device;
   a first solenoid valve connected to the tank, wherein the first solenoid valve is configured to shift between a plurality of positions based on the at least one command signal;

a second solenoid valve connected to the A port, wherein the second solenoid valve is configured to shift between a plurality of positions based on the at least one command signal; and a first check valve having a closed end connected to the B port.

3. The HPU of claim 2, wherein the manifold is connected to the pump via a first opening in a first surface of the tank.

4. The HPU of claim 2, wherein in an initial state:
the motor is in the powered off configuration;
the second solenoid valve is in a first position thereby loading a control check valve wherein a closed end of the control check valve is connected to the A port; and
the first solenoid valve is in a first position, wherein the first position of the first solenoid valve connects an open end of the control check valve to the tank.

5. The HPU of claim 4, wherein the hydraulic fluid entering the A port from the first chamber is blocked from moving by the closed end of the control check valve and the hydraulic fluid entering the B port from the second chamber is blocked from moving by the closed end of the first check valve.

6. The HPU of claim 2, wherein the at least one command signal is an up command signal, wherein:
the second solenoid valve is in a first position thereby loading a control check valve;
the first solenoid valve is in a second position, wherein the second position of the first solenoid valve connects the pump to an open end of the control check valve; and
the motor is in the powered on configuration providing power to the pump to route the hydraulic fluid from the tank to the A port.

7. The HPU of claim 6, wherein the hydraulic fluid exits the A port in to the first chamber of the hydraulic device, thereby placing the hydraulic device in an extending state.

8. The HPU of claim 7, wherein the hydraulic fluid is pushed out of the second chamber and is routed through:
the closed end of the first check valve by overcoming the first check valve setting; and
the first solenoid valve in the second position thereby allowing the hydraulic fluid to flow in to the tank.

9. The HPU of claim 2, wherein the at least one command signal is a down command signal, wherein:
the second solenoid valve is in a second position, thereby loading a control single-directional connector;
the first solenoid valve is in a first position, wherein the first position of the first solenoid valve connects the pump to the open end of the first check valve; and
the motor is in the powered on configuration providing power to the pump to route the hydraulic fluid from the tank to the B port.

10. The power unit of claim 9, wherein the hydraulic fluid exits the B port in to the second chamber of the hydraulic device, thereby placing the hydraulic device in a retracting state.

11. The HPU of claim 10, wherein the hydraulic fluid is pushed out of the first chamber and is routed through:
the control single-directional connector; and
the first solenoid valve in the first position, thereby allowing the hydraulic fluid to flow in to the tank.

12. The HPU of claim 2, wherein the at least one command signal is received from an input device connected to the HPU.

13. The HPU of claim 12, wherein the input device is wirelessly connected to the HPU.

14. The HPU of claim 1, wherein the motor is a direct current motor.

15. The HPU of claim 1, wherein the motor is attached to an interior facing surface of the tank.

16. The HPU of claim 1, wherein the motor is connected to a power source via at least one opening in a first surface of the tank.

17. The HPU of claim 16, wherein the motor is connected to a start solenoid via the at least one opening in the first surface of the tank.

18. The HPU of claim 1, wherein the hydraulic fluid absorbs waste heat produced by the motor.

19. The HPU of claim 1, wherein the hydraulic fluid absorbs noise produced by the motor.

20. The HPU of claim 1, wherein the hydraulic device is a dual-acting hydraulic cylinder.

* * * * *